No. 681,151. Patented Aug. 20, 1901.
F. THEODORE.
TIRE FOR VEHICLES.
(Application filed July 5, 1901.)
(No Model.)
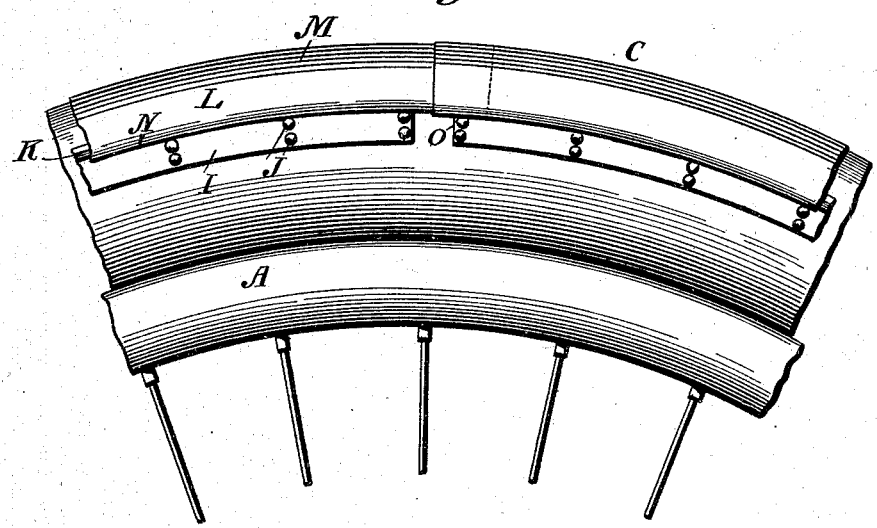
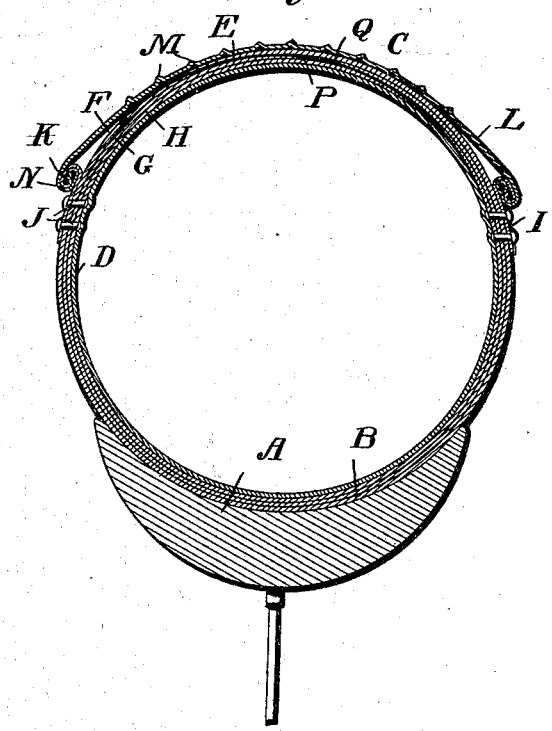
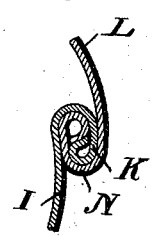
Witnesses
Inventor
F. Theodore
by Wilkinson & Fisher
Attorneys

UNITED STATES PATENT OFFICE.

FRANK THEODORE, OF GREENVILLE, SOUTH CAROLINA.

TIRE FOR VEHICLES.

SPECIFICATION forming part of Letters Patent No. 681,151, dated August 20, 1901.

Application filed July 5, 1901. Serial No. 67,212. (No model.)

*To all whom it may concern:*

Be it known that I, FRANK THEODORE, a citizen of the United States, residing at Greenville, in the county of Greenville and State of South Carolina, have invented certain new and useful Improvements in Tires for Vehicles; and I do hereby declare the following to be a full, clear, and exact description of the invention, such as will enable others skilled in the art to which it appertains to make and use the same.

My invention relates to improvements in pneumatic tires, and has for its object to produce a tire that will be puncture-proof and more durable in wearing qualities than the ordinary rubber tires as now manufactured.

My invention also contains certain features of novelty that will hereinafter appear.

In order to more fully explain my said invention, reference will be had to the accompanying drawings, wherein—

Figure 1 represents a perspective view of a tire manufactured in accordance with my invention attached to the rim of the wheel. Fig. 2 represents a transverse section of the same; and Fig. 3 represents a section, on an enlarged scale, showing the locking edges in detail.

The same letters are used to designate similar parts throughout the views.

A represents the rim or felly of the wheel, in the groove B of which rests the tire C.

The tire C is composed of an ordinary rubber inner tube D, inclosed by the thicker outer casing E. This outer casing has a structure somewhat different from the ordinary outer casing. It is made up of an inner layer of canvas or other tough material F, an intermediate layer of rubber G, and an outer layer of canvas H and is divided longitudinally, the edges P Q overlapping when the steel tire L is in place, these overlapping edges being adapted to be separated when the steel tire is removed to allow access to the inner tube or for other purposes.

I I are a pair of annular rings, one attached upon each side of the outer casing, preferably near the crown of the tire, by means of the rivets J J, spaced at regular intervals around the casing, or, if preferred, they may be cemented or otherwise fastened to the outer casing E. These annular rings are preferably composed of some suitable metal, such as steel, and have their outer edges bent back and doubled upon itself, forming a rounded hook or locking edge partially or completely encircling the tire.

L represents a tire constituting a sheathing, preferably made of thin steel, provided with ridges or corrugations M to prevent slipping upon smooth surfaces. This tire covers the crown of the outer casing and is provided with overturned edges N N, forming a hooked or locking edge similar to the locking edge of the annular rings. These hooks or locking edges N upon each side of the tire L interlock with the locking edges K K of the annular rings I I and make a locking fit with the same. Thus it will be seen that the tire L will not disengage itself when pressure is brought to bear upon the crown or tread of the tire, as the sides of the rubber tire will spread, carrying the rings I I with it, maintaining a tight locked connection.

The steel tire is placed upon the tire in the following manner: After the overlapping edges P Q of the outer casing have been brought together and the tire has been partially inflated, so as to give it a round shape, the end of the steel tire is brought into position, so that the hooks or locking edges N can be inserted behind the hook or locking edges K K of the annular rings I I at the point O, where the rings terminate. The steel tire is slid around the tire until it completely encircles the same and is preferably of such a length that the ends overlap several inches. The inner tire is then inflated, which causes the steel tire to expand outwardly, causing the locking edges to grip each other more tightly, thereby preventing any sliding motion around the wheel. By providing an outer casing having its ends overlapped beneath the steel tire a tight joint is always insured between the locking edges, as said outer casing is free to expand and is only prevented by the steel tire. This feature also allows ready access to the inner tube after the steel tire has been removed.

It is obvious that various changes and modifications might be made in the details of my invention without departing from the spirit thereof.

Having thus described my said invention, what I claim, and desire to secure by Letters Patent of the United States, is—

1. In a pneumatic tire, the combination with the rubber inner and outer tires, annular rings upon each side of said outer tire, rivets passing through said rings and outer tire at regular intervals, and an overturned edge upon each of said rings; of a steel tire covering said outer tire, and overturned edges upon said steel tire adapted to interlock with the edges of said rings, substantially as described.

2. In a pneumatic tire, the combination with an inner tube, an outer casing composed of a layer of rubber, and a layer of canvas upon each side thereof, and an annular ring secured upon each side of said outer casing, provided with an overhanging locking edge; of a steel tire adapted to cover said tire, and an overhanging edge upon said tire adapted to interlock with said locking edges upon the annular rings, substantially as described.

3. In a pneumatic tire, the combination with the inner and outer tires; annular rings secured to said outer tire, and locking devices carried by said rings; of a steel tire adapted to cover said outer tire, longitudinal ridges upon said steel tire, and means carried by said steel tire for interlocking with the locking devices of said rings, substantially as described.

4. In a pneumatic tire, the combination with an inner tube, an outer casing divided longitudinally along its crown, the edges of the divided portion being adapted to overlap, said tire being composed of a layer of rubber, and a layer of canvas upon each side thereof, and an annular ring secured upon each side of said outer casing, provided with an overhanging locking edge; of a steel tire adapted to cover said outer casing, and locking devices carried thereby adapted to interlock with said rings, substantially as described.

In testimony whereof I affix my signature in presence of two witnesses.

FRANK THEODORE.

Witnesses:
W. B. LAINE,
A. L. SCOTT.